(12) United States Patent
Hijishiri et al.

(10) Patent No.: US 6,906,746 B2
(45) Date of Patent: Jun. 14, 2005

(54) IMAGE SENSING SYSTEM AND METHOD OF CONTROLLING OPERATION OF SAME

(75) Inventors: Hideaki Hijishiri, Odawara (JP); Kenji Saito, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 236 days.

(21) Appl. No.: 09/902,111

(22) Filed: Jul. 11, 2001

(65) Prior Publication Data

US 2002/0015098 A1 Feb. 7, 2002

(30) Foreign Application Priority Data

Jul. 11, 2000 (JP) ........................................ 2000-209159

(51) Int. Cl.⁷ .......................... H04N 5/262; H04N 5/222
(52) U.S. Cl. ............................... 348/240.2; 348/333.03
(58) Field of Search .......................... 348/240.2, 333.03, 348/333.01, 333.11, 333.12, 333, 240

(56) References Cited

U.S. PATENT DOCUMENTS

| | | | | |
|---|---|---|---|---|
| 5,172,234 A | * | 12/1992 | Arita et al. .............. | 348/240.2 |
| 5,557,328 A | * | 9/1996 | Ishihama et al. ........ | 348/240.3 |
| 5,838,370 A | * | 11/1998 | Kaji ........................ | 348/240.2 |
| 5,920,348 A | * | 7/1999 | Ejima ..................... | 348/333.09 |
| 5,930,528 A | * | 7/1999 | Ito et al. ................. | 396/374 |
| 6,522,360 B1 | * | 2/2003 | Miyawaki et al. ....... | 348/240.2 |
| 6,559,888 B1 | * | 5/2003 | Doron .................... | 348/240.99 |
| 6,643,416 B1 | * | 11/2003 | Daniels et al. .......... | 348/333.12 |
| 6,704,048 B1 | * | 3/2004 | Malkin et al. ........... | 348/240.2 |
| 2001/0010561 A1 | * | 8/2001 | Nagai ..................... | 348/240 |

* cited by examiner

*Primary Examiner*—Thai Tran
*Assistant Examiner*—Nhan T. Tran
(74) *Attorney, Agent, or Firm*—Birch, Stewart, Kolasch & Birch, LLP

(57) ABSTRACT

When a subject is imaged for the purpose of deciding the angle of view, the full image that is capable of being sensed by a CCD is displayed on an LCD. The user designates the position of a cropping area in the image being displayed. Only image data representing the image within the border of the designated area is recorded on a memory card. Since the amount of image data to be recorded on the memory card is thus reduced, image data representing images of a greater number of frames can be recorded on the memory card.

5 Claims, 8 Drawing Sheets

ORDINARY SENSED IMAGE

CROPPED SENSED IMAGE

ORDINARY SENSED IMAGE

CROPPED SENSED IMAGE

ORDINARY SENSED IMAGE

CROPPED SENSED IMAGE

ORDINARY SENSED IMAGE

CROPPED SENSED IMAGE

IMAGE SENSING SYSTEM AND METHOD OF CONTROLLING OPERATION OF SAME

BACKGROUND OF THE INVENTION

1. Field of the Invention

This invention relates to an image sensing system for sensing the image of a subject and obtaining image data representing the image of the subject.

2. Description of the Related Art

The CCDs used in image sensing devices such as digital still cameras are being manufactured with ever greater numbers of pixels. This increase in the number of pixels used in CCDs has made it possible to obtain high-quality images.

Though an image obtained with a CCD having a large number of pixels has a high image quality, the amount of image data representing the image also is large. As a consequence, there are detrimental effects such as a decline in the number of image frames that can be recorded on a memory card and a prolonged period of time for recording and for read-out.

Digital cameras having a zoom function also are increasing in number. If a zoom area is designated in such a camera, the image within the designated zoom area is enlarged and displayed on a display device located on the back of the digital still camera. However, if the designated area is dark, the entirety of the enlarged image also appears dark and is difficult to see.

DISCLOSURE OF THE INVENTION

Accordingly, an object of the present invention is to prevent the detrimental effects that accompany an increase in the number of pixels constituting a solid-state electronic image sensing device such as a CCD.

According to a first aspect of the present invention, the foregoing object is attained by providing an image sensing system comprising: an image sensing unit for sensing the image of a subject and outputting image data representing the image of the subject; a volatile memory for temporarily storing the image data output from the image sensing unit; a first display controller for controlling the display unit in such a manner that the image of the subject represented by the image data that has been stored in the volatile memory is displayed on a display screen; a zoom-area designating unit for designating a zoom area in the image of the subject being displayed on the display screen; and a recording controller for recording, on a recording medium, image data, which is contained in the image data output from the image sensing device, representing an image within the area designated by the zoom-area designating unit.

The first aspect of the present invention provides also an operation control method suited to the above-described system. Specifically, the present invention provides a method of controlling operation of an image sensing system, comprising the steps of: sensing the image of a subject and obtaining image data representing the image of the subject; temporarily storing the obtained image data in a volatile memory; displaying the image of the subject, which is represented by the image data that has been stored in the volatile memory, on a display screen of a display unit; designating a zoom area in the image of the subject being displayed on the display screen; and recording, on a recording medium, image data, which is contained in the image data obtained by image sensing, representing an image within the designated area.

In accordance with the first aspect of the present invention, the image of a subject is sensed and the image of the subject obtained by such image sensing is displayed on the display screen of a display unit. A zoom area is designated in the image of the subject displayed on the display screen. Image data representing the image within the designated zoom area and contained in the image data obtained by image sensing is recorded on a recording medium.

All of the data obtained by image sensing is not recorded on the recording medium; the image data recorded on the recording medium is that representing the image within the designated zoom area. As a result, the amount of image data recorded is reduced. Thus, image data representing images of a large number of frames can be recorded on the recording medium. In addition, the time needed to record image data and to read out image data is shortened.

Furthermore, since image data is stored temporarily in the volatile memory, zoom processing can be executed comparatively simply and precisely using the stored image data.

Preferably, an image within the designated zoom area is displayed on the display screen as an image of one frame. Since the image within the zoom area is displayed as an image of one frame, the image in the designated zoom area can be ascertained at a glance.

The system further comprises a zoom unit for applying zoom processing to image data representing the image within the zoom area designated by the zoom-area designating unit. In this case, the display unit would be controlled in such a manner that the zoom image represented by the image data that has undergone zoom processing is displayed on the display screen as the image of one frame.

The system further comprises a determination unit for determining whether the image within the zoom area designated by the zoom-area designating unit has suitable brightness; and a brightness adjustment unit, responsive to a determination by the brightness determination unit that the image within the zoom area does not have suitable brightness, for adjusting luminance level of the image within the zoom area in such a manner that the brightness of the image within the zoom area becomes a suitable brightness.

The image obtained by zoom processing thus will have suitable brightness. Even if a dark portion has been designated as the zoom area, it is possible to prevent this portion from becoming difficult to see.

The system may further comprise a third display controller for controlling the display unit so as to display the zoom area on the display screen, and a designating unit for designating the size of the zoom area. In this case, the recording controller would store image data, which represents an image within a zoom area having a size conforming to the designation made by the designating unit, on a recording medium.

Thus, a zoom area having a desired size can be designated.

According to a second aspect of the present invention, the foregoing object is attained by providing an image sensing system comprising: an image sensing unit for sensing the image of a subject and outputting image data representing the image of the subject; a first display controller for controlling a display unit in such a manner that an image represented by the image data output from the image sensing unit is displayed on a display screen; a zoom-area designating unit for designating a zoom area in the image of the subject being displayed on the display screen; a zoom unit for applying zoom processing to image data representing the image within the zoom area designated by the zoom-area designating unit; a determination unit for determining whether the image within the zoom area designated by the zoom-area designating unit has suitable brightness; an adjustment unit, responsive to a determination by the brightness determination unit that the image within the zoom area does not have suitable brightness, for adjusting luminance level of the image data output from the image sensing unit in such a manner that the image within the zoom area will have a suitable brightness; and a second display controller for controlling the display unit in such a manner that a zoom image represented by the image data whose brightness has been adjusted by the adjustment unit is displayed on the display screen.

The second aspect of the present invention provides also an operation control method suited to the above-described system. Specifically, the present invention provides a method of controlling operation of an image sensing system, comprising the steps of: sensing the image of a subject and obtaining image data representing the image of the subject; displaying an image represented by the obtained image data on a display screen; applying zoom processing to image data, which represents an image within a zoom area, in the image of the subject being displayed on the display screen; determining whether the image within the zoom area has suitable brightness; adjusting luminance level of the image data obtained by image sensing, in such a manner that the image within the zoom area will have a suitable brightness, in response to a determination that the image within the zoom area does not have suitable brightness; and displaying a zoom image, which is represented by the image data whose brightness level has been adjusted, on the display screen.

In accordance with the second aspect of the present invention, the image of a subject is displayed on the display screen of a display unit by sensing the image. A zoom area in the displayed image of the subject is designated and image data representing the image within the zoom area is subjected to zoom processing. Brightness of the subject is adjusted in such a manner that brightness of the image within the designated zoom area becomes a suitable brightness. Thus a zoom image whose brightness has been adjusted is displayed.

Thus, an advantage of the second aspect of the invention also is that even if a dark portion has been designated as the zoom area, it is possible to prevent this portion from becoming difficult to see.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A first embodiment of the present invention will now be described with reference to the drawings.

Figure 1:
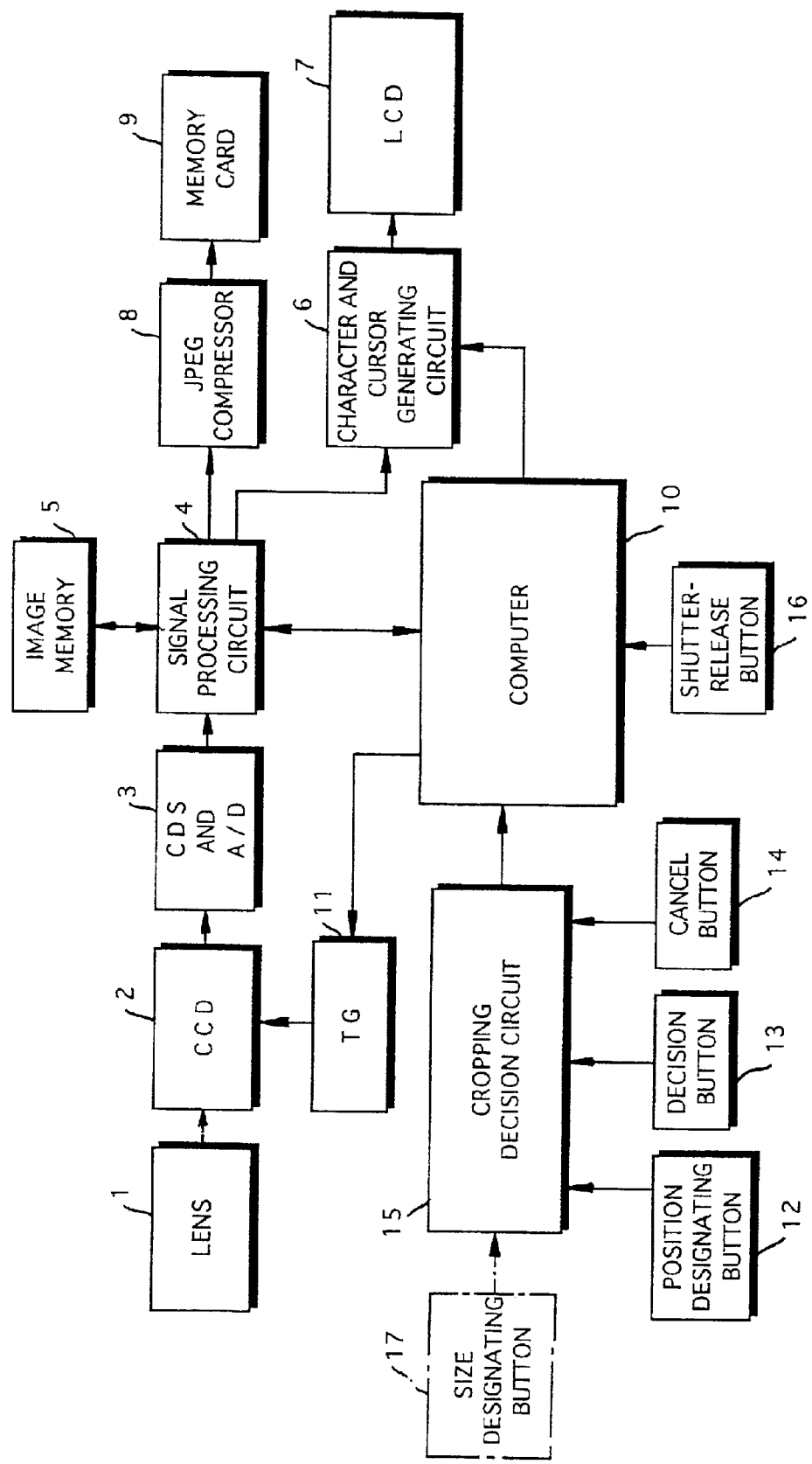
FIG. 1 is a block diagram illustrating the electrical construction of a digital still camera.

FIG. 1 is a block diagram illustrating the electrical construction of a digital still camera embodying the present invention.

The overall operation of the digital still camera is controlled by a computer 10 to which a shutter-release signal from a shutter-release button 16 is applied as an input.

The digital still camera according to this embodiment is capable of designating a desired area (referred to as a "cropping area") in a full image capable of being sensed by a CCD 2. Image data representing an image within the designated cropping area is recorded on a memory card 9. To accomplish this, the digital still camera includes a position designating button 12 for designating the position of the cropping area, a decision button 13 for deciding the designated cropping area, and a cancel button 14. Signals indicative of operation of the buttons 12, 13 and 14 are input to a cropping decision circuit 15.

On the basis of input signals thereto, a cropping decision circuit 15 decides the position at which the cropping area is to be displayed on the image of a subject obtained by imaging. A signal indicating the decided position is input to the computer 10.

The digital still camera according to this embodiment is capable of displaying the image of a subject, which has been obtained by sensing the image of the subject, on a display screen of a liquid crystal display device 7. Image sensing includes ordinary image sensing (an image obtained by ordinary image sensing shall be referred to as an "ordinary sensed image") in which the full image sensed by the CCD 2 is displayed on the display screen of the liquid crystal display device 7 as an image of one frame, and cropping image sensing (an image obtained by cropping image sensing shall be referred to as an "cropped sensed image") in which an image within the cropping area is displayed on the display screen of the liquid crystal display device 7 as an image of one frame in a manner described later.

The image of the subject is formed on photoreceptor surface of the CCD 2 by a lens 1. The CCD 2 is driven by a timing generator 11 to sense the image of the subject at regular time intervals (e.g., 1/60 of a second). A video signal representing the image of the subject is output from the CCD 2 at the regular time intervals. The video signal output from the CCD 2 is input to a CDS (Correlated Double Sampling) and analog/digital conversion circuit 3. The latter converts the analog video signal to digital image data.

Digital image data representing one frame of the image of the subject is stored temporarily in an image memory (volatile memory) 5 via a signal processing circuit 4. The digital image data is read out of the image memory 5 and input to the signal processing circuit 4. The signal processing circuit 4 generates luminance data and color difference data and integrates the luminance data. The signal processing circuit 4 has other signal processing functions as well.

The signal processing circuit 4 generates the luminance data and the color difference data from image data read out of the image memory 5. The generated luminance data and color difference data is applied to the liquid crystal display device 7 via a character and cursor generating circuit 6. The image of a subject obtained by image sensing is displayed on the display screen of the liquid crystal display device 7 as a moving image. In ordinary image sensing, as will be described later, the full image capable of being sensed by the CCD 2 is displayed on the display screen of the liquid crystal display device 7. In cropped image sensing, the image within the cropping area is displayed on the display screen of the liquid crystal display device 7.

Further, as will be described later, luminance data within the cropping area is integrated by the signal processing circuit 4. Data representing the integrated value is applied to the computer 10. On the basis of the data representing the integrated value applied thereto, the computer 10 determines whether the image within the cropping area is dark. If it is determined that the image is dark, the signal processing circuit 4 raises the level of the luminance data representing the image within the cropping area in such a manner that the image within the cropping area is brightened.

The digital still camera includes the above-mentioned character and cursor generating circuit 6. On the basis of the cropping area decided by the cropping decision circuit 15, the character and cursor generating circuit 6 creates data representing the cropping area and data using characters to indicate the number of pixels constituting the cropping area. The created data is applied to the liquid crystal display device 7, where a border and the size thereof are displayed on the image of the subject is superimposed form.

If the shutter-release button 16 is pressed, image data representing the image of the subject sensed at the timing of button depression is stored temporarily in the image memory 5. The image data is read out of the image memory 5 and is subjected to processing in the signal processing circuit 4 to generate luminance data and color difference data. The generated luminance data and color difference data is applied to the image memory 5 again and is stored temporarily therein.

Image data representing the image within the cropping area, which is contained in the image data of the full sensed image stored in the image memory 5, is read out of the image memory 5. The image data that has been read out is subjected to data compression in a JPEG (Joint Photographic Experts Group) compression circuit 8 via the signal processing circuit 4. The compressed image data is applied to the memory card 9 and recorded thereon.

Since the image data representing the image within the cropping area is recorded on the memory card 9, the amount of image data is reduced as compared with the case where the image data representing the full image capable of being sensed by the CCD 2 is recorded on the memory card 9. This makes it possible to record image data representing images of a comparatively large number of frames on the memory card 9. The image data representing the image within the cropping area recorded in the memory card 9 may be image data of an image that has been brightened or image data that prevails prior to the brightness adjustment.

Figure 2:
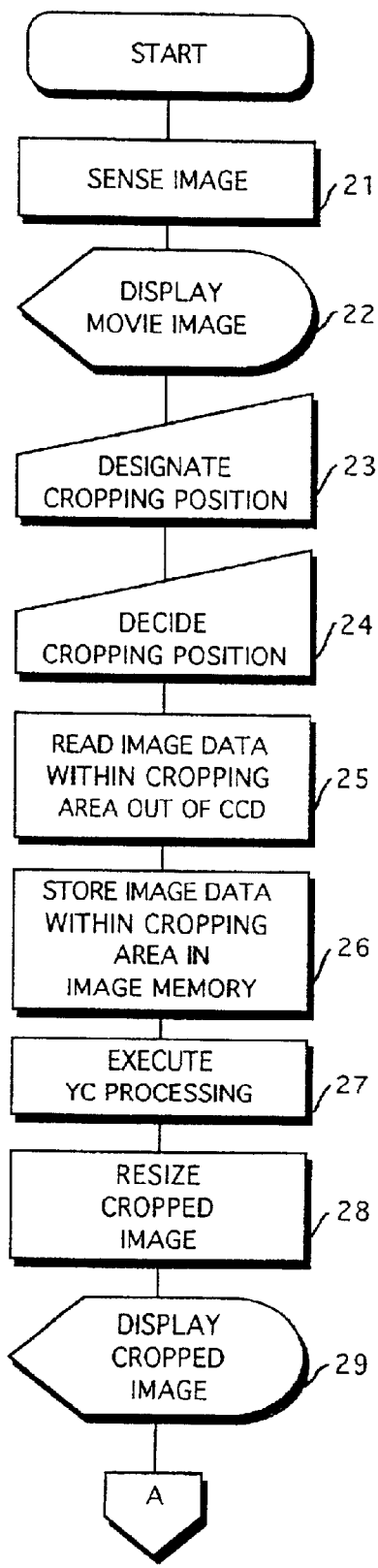
FIGS. 2 and 3 are flowcharts illustrating processing executed by the digital still camera.
Figure 3:
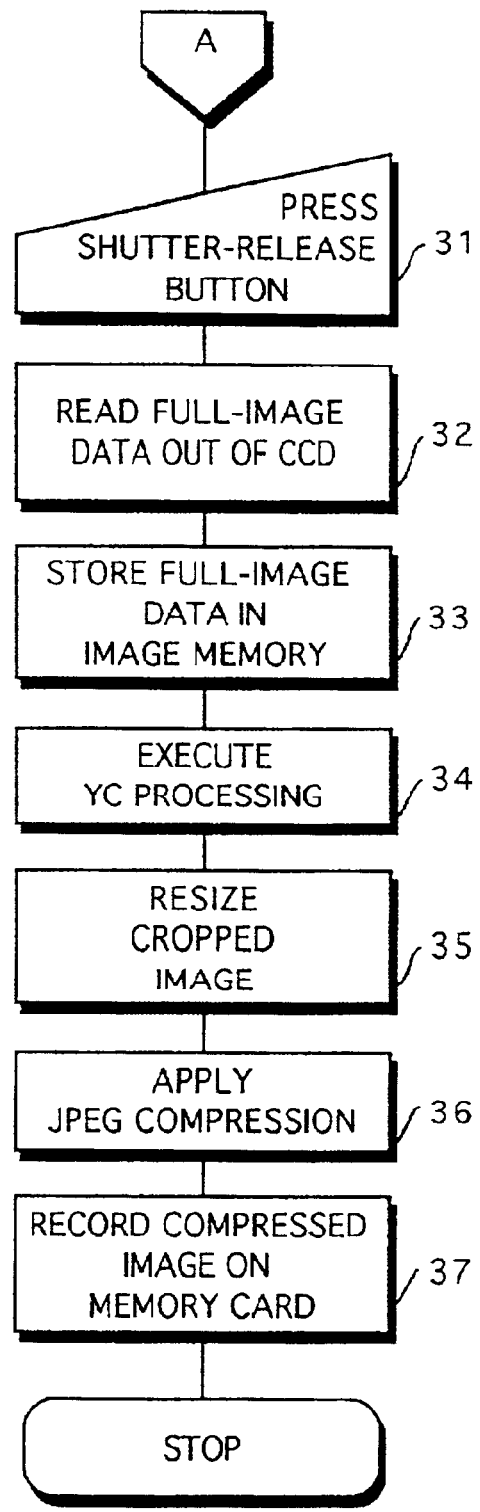
Figure 4:
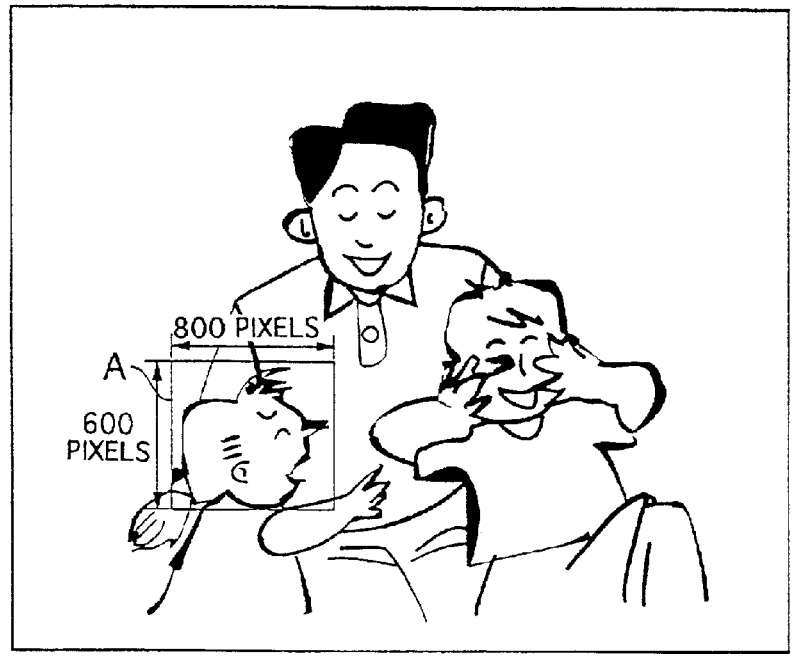
FIG. 4 is a diagram showing an example of an ordinary image obtained by image sensing.
Figure 5:
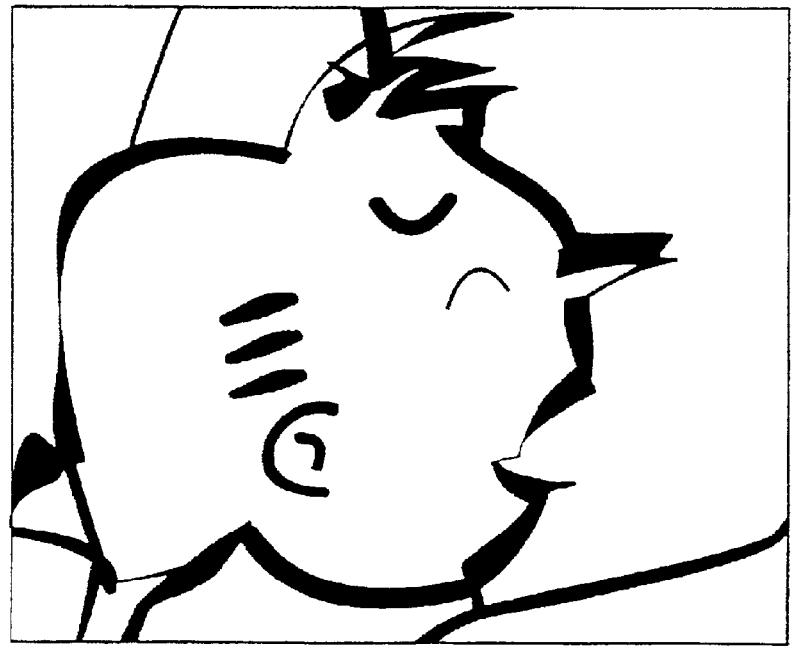
FIG. 5 is a diagram showing an example of a sensed image that has undergone cropping.

FIGS. 2 and 3 are flowcharts illustrating recording processing executed by the digital still camera, and FIGS. 4 and 5 illustrate examples of the images of a subject displayed on the display screen of the liquid crystal display device 7, in which FIG. 4 shows an example of an ordinary sensed image and FIG. 5 an example of a cropped sensed image.

As set forth above, the image of a subject is sensed (step 21) by the CCD 2 and the ordinary sensed image shown in FIG. 4 is displayed on the display screen of the liquid crystal display device 7 in the form of a movie (step 22). The ordinary sensed image is represented by image data obtained on the basis of the full image capable of being sensed by the CCD 2, as described above.

While observing the ordinary sensed image being displayed on the display screen of the liquid crystal display device 7, the user designates the position of the cropping area using the position designating button 12 (step 23). Prescribed data is supplied from the character and cursor generating circuit 6 to the liquid crystal display device 7, as described above, whereupon a border A of the designated cropping area is displayed on the ordinary sensed image. The user observes the displayed border A and if the position thereof is acceptable, presses the decision button 13 (step 24). (In this embodiment, the size of the cropping area is fixed but the position of the cropping area can be changed by the position designating button 12.)

If the position of the cropping area is decided, read-out of the CCD 2 is controlled with regard to pixels that substantially correspond to the interior of the border A of the cropping area whose position has been decided (step 25). As a result, image data representing the image within the border A of the cropping area is applied to and stored temporarily in the image memory 5 (step 26). Of course, because it is difficult to drive the CCD 2 accurately so as to read the video signal representing the image within the border A of the cropping area out of the CCD 2, the CCD 2 would be driven so as to output a video signal representing an image slightly larger than the border A.

The image data representing the image within the cropping area is read out of the image memory 5 and is subjected to processing in the signal processing circuit 4 so that luminance data and color difference data is generated, as set forth above (step 27). The generated luminance data and color difference data is applied to and temporarily stored in the image memory 5.

Addressing of the image memory 5 is controlled so as to accurately extract the image within the border A of the cropping area in the image data stored in the image memory 5. As a result, image data representing an accurate image that corresponds to the area inside the border A is read out of the image memory 5 (step 28; resize cropped image).

The image data that has been read out of the image memory 5 is applied to the computer 10 and subjected to zoom processing. The image data that has undergone zoom processing is applied to and stored temporarily in the image memory 5 again.

The image data that has undergone zoom processing is read out of the image memory 5 and applied to the liquid crystal display device 7 via the character and cursor generating circuit 6. As a result, the cropped sensed image shown in FIG. 5 is displayed on the display screen of the liquid crystal display device 7. Since the cropped sensed image is displayed on the entire display screen of the liquid crystal display device 7, it is enlarged as compared with the image displayed in the border A of the ordinary sensed image. This makes the image easier to see.

If the shutter-release button 16 is pressed while the cropped sensed image is being displayed on the display screen of the liquid crystal display device 7 (step 31), a video signal representing the full image is read out of the CCD 2 (step 32). The image data representing the full image obtained by sensing is applied to the image memory 5 and stored in the memory 5 temporarily, as mentioned above (step 33). The image data representing the full image obtained by sensing is read out of the image memory 5 and subjected to processing in the signal processing circuit 4 to generate luminance data and color difference data, as mentioned above (step 34). The generated luminance data and color difference data is applied to the image memory 5 again and stored there temporarily.

Image data representing the image within the cropping area and contained in the image data of the full sensed image stored in image memory 5 is read out (step 35) and is subjected to compression in the JPEG compression circuit 8 (step 36). The compressed image is recorded on the memory card 9 (step 37).

Since the image data representing the image within the cropping area is recorded on the memory card 9, the amount of image data to be recorded is less as compared with the case where the image data representing the full image obtained by sensing is recorded on the memory card 9. The image data representing the image of many frames can be recorded on the memory card 9. An arrangement may be adopted in which image data representing the image within the cropping area is subjected to subsampling and the subsampled image data is recorded on the memory card 9. The subsampling processing would be executed in the signal processing circuit 4.

Figure 6:
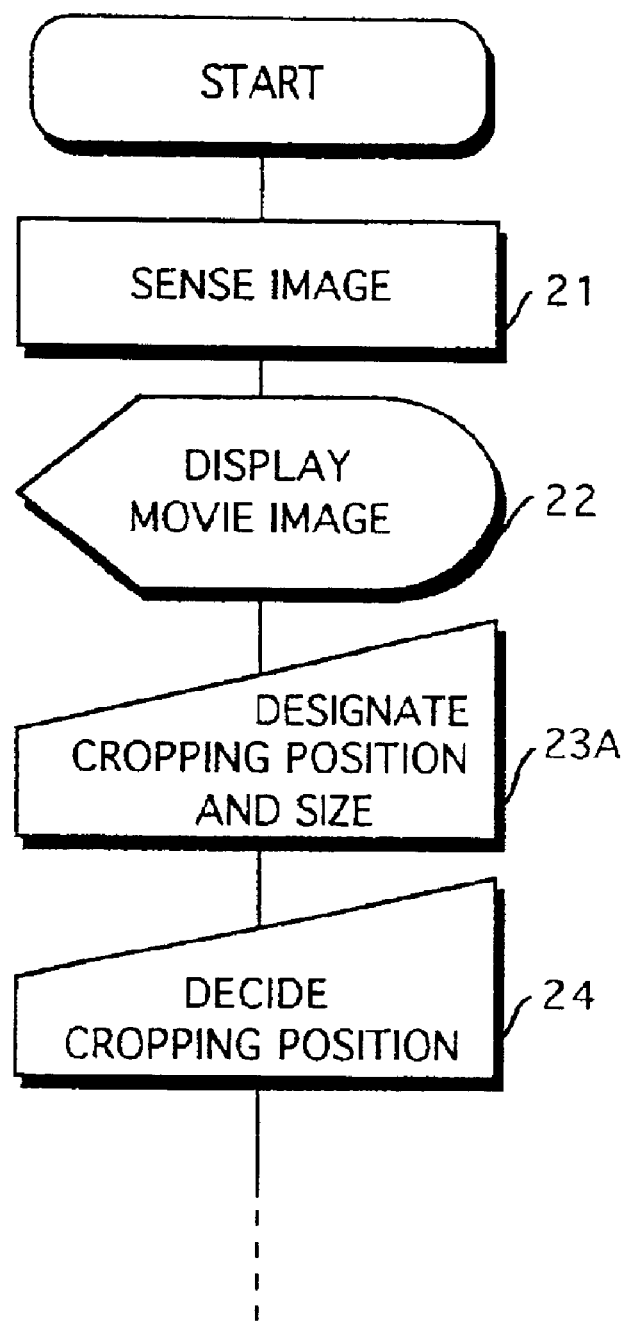
FIG. 6 is a flowchart illustrating part of the processing executed by a digital still camera according to a second embodiment.
Figure 7:
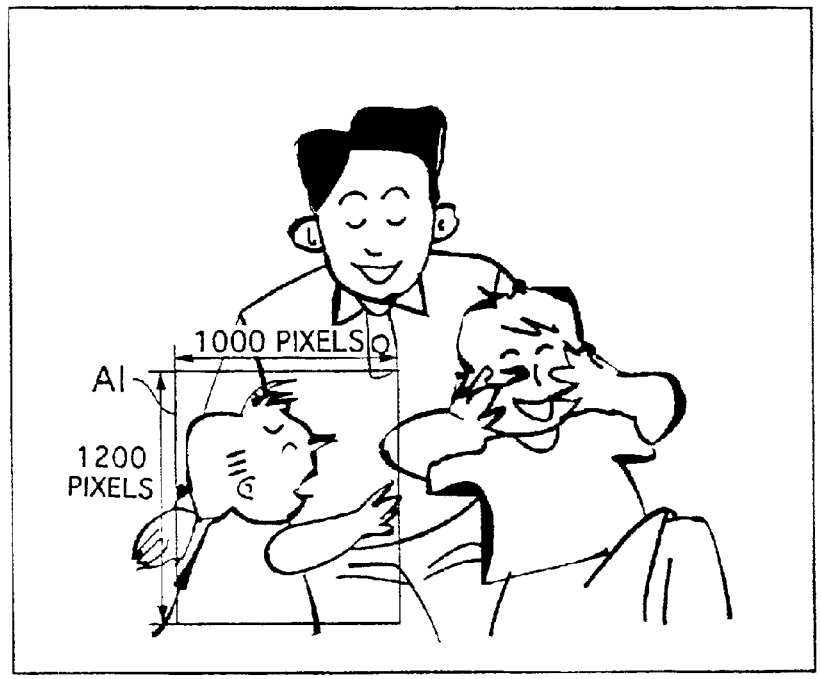
FIG. 7 is a diagram showing an example of an ordinary image obtained by image sensing according to a second embodiment.
Figure 8:
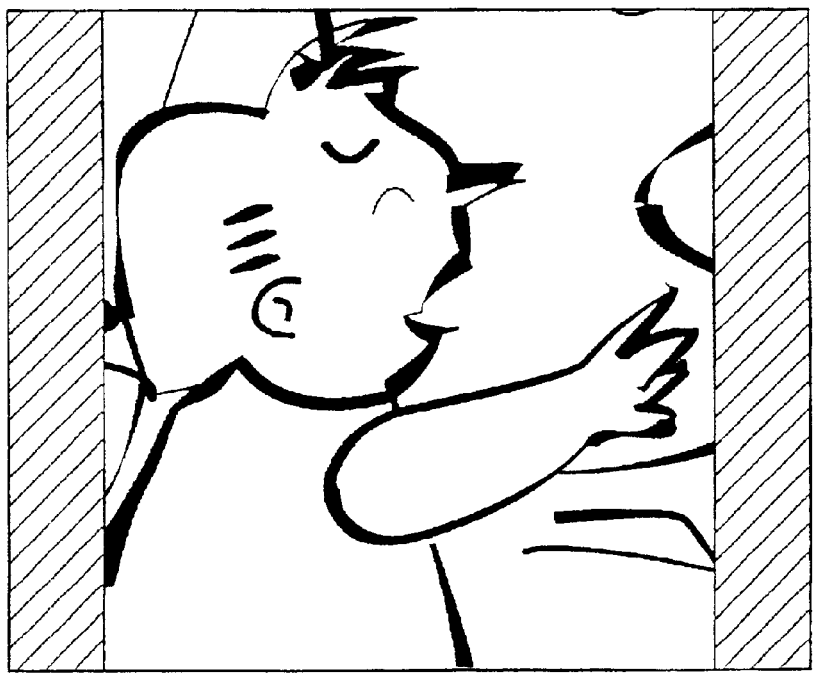
FIG. 8 is a diagram showing an example of a sensed image that has undergone cropping according to a second embodiment.

FIGS. 6 to 8 illustrate a second embodiment of the present invention, in which FIG. 6 is a flowchart illustrating part of the processing executed by the digital still camera in this embodiment. Processing of steps in FIG. 6 identical with those shown in FIG. 2 are designated by like step numbers and need not be described again. FIGS. 7 and 8 illustrate examples of images displayed on the display screen of liquid crystal display device 7, in which FIG. 7 shows an example of an ordinary sensed image and FIG. 8 an example of a cropped sensed image.

In the above-described embodiment, the size of the cropping area is fixed. In this embodiment, however, the size of the cropping area can be changed. In this case, the digital still camera would be provided with a size designating button 17 for designating the size of the cropping area, as shown in FIG. 1.

The ordinary sensed image is displayed on the display screen of the liquid crystal display device 7 as described above (step 22). While observing the ordinary sensed image, the user designates the size of the cropping area using the size designating button 17 and decides the position of the cropping area using the position designating button 12 (step 23A). As a result, a border Al, which indicates the cropping area, is displayed on the ordinary sensed image together with the position and size set by the user, as illustrated in FIG. 7.

The cropped sensed image within the border Al is thenceforth displayed on the entire display screen of the liquid crystal display device 7 as an image of one frame, as set forth above (see FIG. 8).

Thus, the user is capable of freely designating not only the position of the cropping area but also the size of the cropping area. If this arrangement in which the size of the cropping area can be designated by the user at will is adopted, the aspect ratio of the display screen of liquid crystal display device 7 will differ from that of the cropping area. In this case, image processing would be applied in such a manner that the image within the cropping area is circumscribed within the display screen of the liquid crystal display device 7 and an image of black fill (indicated by the hatching in FIG. 8) would be displayed where the aspect ratio of the image of the cropping area does match that of the display screen. It goes without saying that other processing may also be carried out.

Figure 9:
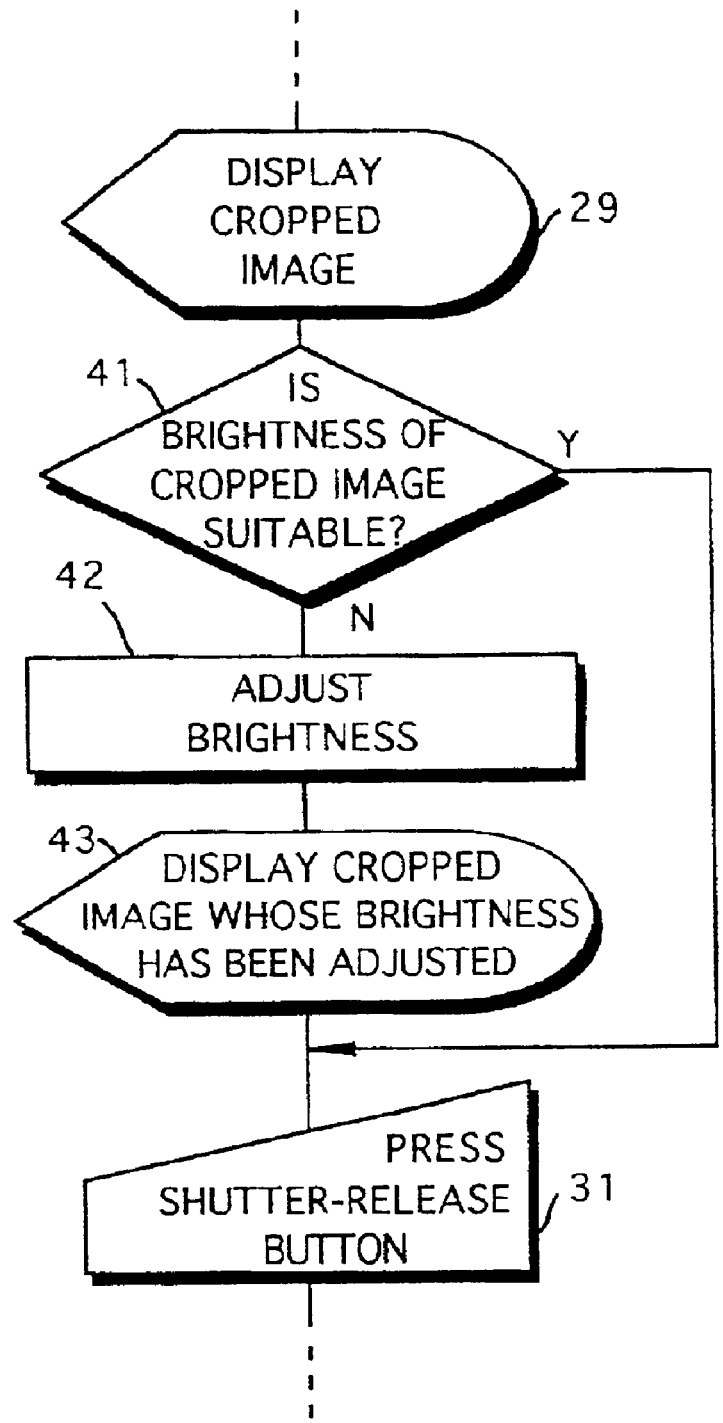
FIG. 9 is a flowchart illustrating part of the processing executed by a digital still camera according to a third embodiment.
Figure 10:
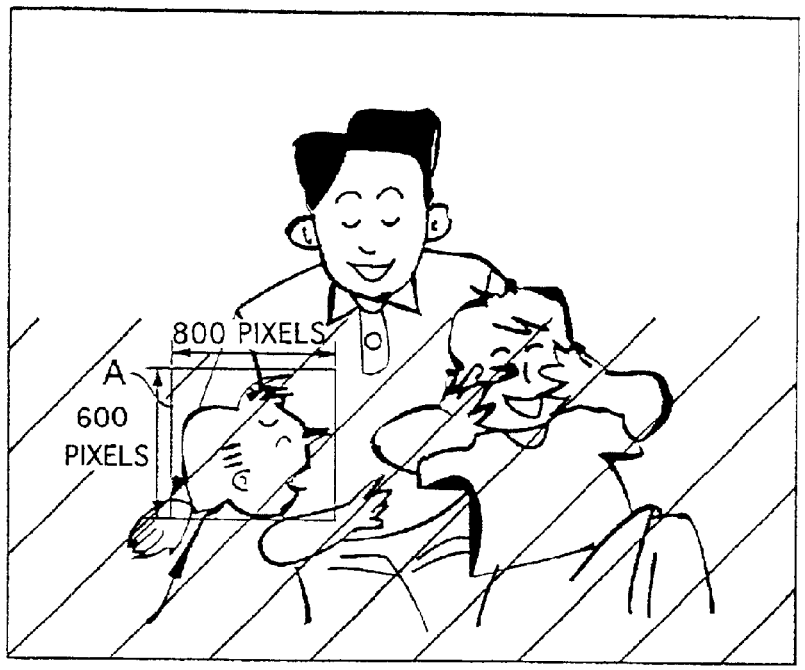
FIG. 10 is a diagram showing an example of an ordinary image obtained by image sensing according to a third embodiment.
Figure 11:
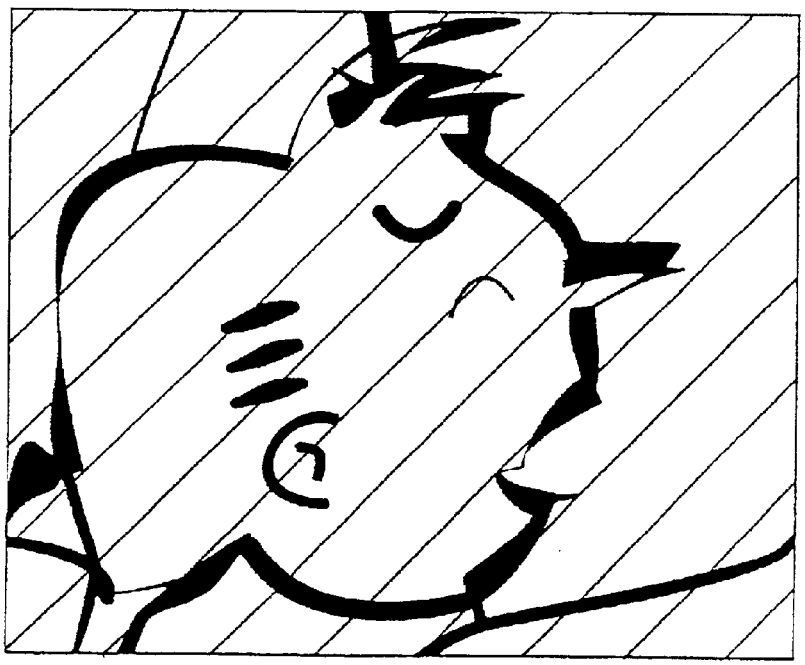
FIG. 11 is a diagram showing an example of a sensed image that has undergone cropping according to a third embodiment.

FIGS. 9 to 11 illustrate a third embodiment of the invention, in which FIG. 9 is a flowchart illustrating part of the processing executed by the digital still camera in this embodiment. FIGS. 10 and 11 illustrate examples of images displayed on the display screen of liquid crystal display device 7, in which FIG. 10 shows an example of an ordinary sensed image and FIG. 11 an example of a cropped sensed image. That part of the subject in FIGS. 10 and 11 is dark is indicated by hatching.

If the cropping area A is located in the dark portion of the subject, as shown in FIG. 10, the cropped image will be dark and difficult to see, as depicted in FIG. 11. This embodiment is such that when the cropping area A is in the dark portion of the subject, as mentioned above, the level of the luminance data is adjusted so as to obtain a suitable brightness and a cropped sensed image having this suitable brightness is displayed.

As set forth above, the cropping area A is designated and the cropped sensed image is displayed on the display screen of the liquid crystal display device 7 (step 29). The luminance data of the image within the designated cropping area is integrated by the signal processing circuit 4. The data representing the integrated value is applied to the computer 10 which, on the basis of the integrated value, determines whether the cropped image (or the image within the cropping area A) has a suitable brightness (step 41). For example, if the level of the luminance signal falls within the range "150 to 200" among 256 levels, the computer 10 judges that the brightness is appropriate.

If the cropped sensed image does not have the proper brightness ("NO" at step 41), then the level of the luminance data of the cropped sensed image is raised, as described above (step 42; adjust brightness). The cropped sensed image whose brightness has thus been adjusted is displayed on the display screen of the liquid crystal display device 7 (step 43). The brightness adjustment may involve changing the level of the luminance signal or changing the grayscale characteristic.

When a white balance adjustment is performed in the signal processing circuit 4, this adjustment can be applied to the image within the cropping area.

As many apparently widely different embodiments of the present invention can be made without departing from the spirit and scope thereof, it is to be understood that the invention is not limited to the specific embodiments thereof except as defined in the appended claims.

What is claimed is:

1. An image sensing system comprising:
   an image sensing unit for sensing an image of a subject and outputting image data representing the image of the subject;
   a volatile memory for temporarily storing the image data output from said image sensing unit;
   a first display controller for controlling a display unit in such a manner that the image of the subject represented by the image data that has been stored in said volatile memory is displayed on a display screen;
   a zoom-area designating unit for designating a zoom area in the image of the subject being displayed on the display screen;

a recording controller for recording, on a recording medium, image data, which is contained in the image data output from said image sensing device, representing an image within the area designated by said zoom-area designating unit, wherein said recording controller records image data without interpolation processing; and an image sensing control unit for controlling said image sensing unit so as to output image data representing an image within an area which is smaller than a frame of image represented by the image data outputted from said image sensing unit, and which area is bigger than the zoom area designated by said zoom-area designating unit.

2. The system according to claim 1, further comprising a second display controller for controlling said display unit in such a manner that an image within the zoom area designated by said zoom-area designating unit is displayed on the display screen as an image of one frame.

3. The system according to claim 2, further comprising a zoom unit for applying zoom processing to image data representing the image within the zoom area designated by said zoom-area designating unit;

wherein said second display control unit controls said display unit in such a manner that a zoom image represented by the image data to which zoom processing has been applied by said zoom unit is displayed on the display screen as an image of one frame.

4. The system according to claim 3, further comprising:

a brightness determination unit for determining whether the image within the zoom area designated by said zoom-area designating unit has suitable brightness; and a brightness adjustment unit, responsive to a determination by said brightness determination unit that the image within the zoom area does not have suitable brightness, for adjusting luminance level of the image within the zoom area in such a manner that the image within the zoom area takes on a suitable brightness.

5. A method of controlling operation of an image sensing system, comprising the steps of:

sensing the image of a subject and obtaining image data representing the image of the subject;

temporarily storing the obtained image data in a volatile memory;

displaying the image of the subject, which is represented by the image data that has been stored in the volatile memory, on a display screen of a display unit;

designating a zoom area in the image of the subject being displayed on the display screen;

recording, on a recording medium, image data, which is contained in the image data obtained by image sensing, representing an image within the designated area, wherein said recording records image data without interpolation processing; and an image sensing control unit for controlling said image sensing unit so as to output image data representing an image within an area which is smaller than a frame of image represented by the image data outputted from said image sensing unit, and which area is bigger than the zoom area designated by said zoom-area designating unit.

* * * * *